United States Patent [19]

Juhl et al.

[11] Patent Number: 5,288,532
[45] Date of Patent: Feb. 22, 1994

[54] TRANSFERABLE MODIFIER-CONTAINING FILM

[75] Inventors: Roger L. Juhl, Asheville, N.C.; Stanley Lustig, Park Forest; Donatas Tijunelis, Buffalo Grove, both of Ill.

[73] Assignee: Viskase Corporation, Chicago, Ill.

[21] Appl. No.: 966,915

[22] Filed: Oct. 27, 1992

Related U.S. Application Data

[63] Continuation of Ser. No. 573,770, Aug. 28, 1990, abandoned.

[51] Int. Cl.$^5$ .................... B32B 27/08; C08L 23/08; C08L 71/02
[52] U.S. Cl. ................... 428/35.2; 428/34.8; 428/35.4; 524/502; 524/538; 525/178; 525/187; 426/127; 206/802; 138/118.1
[58] Field of Search ............ 428/34.8, 35.4, 35.2; 524/502, 538; 525/178, 187; 426/127; 206/802; 138/118.1

[56] References Cited

U.S. PATENT DOCUMENTS

| | | | |
|---|---|---|---|
| Re. 33,093 | 10/1989 | Schiraldi et al. | 424/676 |
| 3,366,710 | 1/1968 | Press | 525/187 |
| 3,425,981 | 2/1969 | Puletti et al. | 525/187 |
| 4,442,868 | 4/1984 | Smith et al. | 428/34.8 |
| 4,481,254 | 11/1984 | Fukushima et al. | 428/329 |
| 4,519,801 | 5/1985 | Edgren | 424/427 |
| 4,678,684 | 7/1987 | Sand | 427/213.36 |
| 4,784,863 | 11/1988 | Lustig et al. | 426/113 |
| 4,847,145 | 7/1989 | Matsui | 428/323 |
| 4,851,245 | 7/1989 | Hisazumi et al. | 426/105 |
| 4,865,901 | 9/1989 | Ohno et al. | |
| 4,877,626 | 10/1989 | Ande et al. | 426/250 |
| 4,906,495 | 3/1990 | Martini et al. | 428/36.7 |
| 4,997,690 | 3/1991 | Lustig et al. | 428/35.4 |

FOREIGN PATENT DOCUMENTS

| | | |
|---|---|---|
| 0100858 | 5/1984 | European Pat. Off. |
| 0214503 | 12/1987 | European Pat. Off. |
| 0252597 | 12/1987 | European Pat. Off. |
| 2372861 | 5/1978 | France |
| 54-092406 | 7/1979 | Japan |
| 589274 | 6/1947 | United Kingdom |

OTHER PUBLICATIONS

"Polyox Water-Soluble Resins", Union Carbide Corporation 1988, (20 pages).

"Handbook of Water-Soluble Gums and Resins", R. L. Davidson pp. 19-1 through 19-5 (1980).

Primary Examiner—Paul R. Michl
Assistant Examiner—Andrew E. C. Merriam
Attorney, Agent, or Firm—John C. LeFever

[57] ABSTRACT

An extruded film article such as a bag comprises a blend of a thermoplastic polymer such as ethylene vinyl acetate and an olefinic oxide polymer such as poly (ethylene oxide), with a modifier such as liquid smoke absorbed in the blend. The modifier is transferable from the film to a receiving surface such as a food body in fluid transfer relationship with the film.

38 Claims, No Drawings

TRANSFERABLE MODIFIER-CONTAINING FILM

This application is a continuation of prior U.S. application Ser. No. 07/573,770 filed Aug. 28, 1990, now abandoned.

FIELD OF THE INVENTION

This invention relates to an extruded thermoplastic film containing a modifier which is transferable from the film to a receiving surface in fluid transfer relationship with the film, as for example a plastic bag containing liquid smoke which is transferred to the outer surface of meat during hot water cook-in of the meat within the bag.

BACKGROUND OF THE INVENTION

Foods are often processed, i.e. cooked, in a thermoplastic film package by for example at least partially immersing the package in hot water or placing the package in a steam-heated environment. The processed food package may then be refrigerated until the processed food is to be consumed, and then reheated. Alternatively the processed food may be immediately removed from the thermoplastic film enclosure, as for example a casing or bag for consumption. Lustig et al U.S. Pat. No. 4,784,863, incorporated herein to the extent pertinent, describes such a cook-in system. Also described therein is a three layer film prepared by coextrusion, biaxial orientation to impart heat shrinkability, and then irradiation of the biaxially oriented film to widen the heat sealing temperature range and improve certain physical properties. The film may for example comprise an ethylene vinyl acetate (hereafter "EVA") inner layer, a vinylidene chloride copolymer oxygen barrier-core layer and an EVA outer layer.

It may be desirable to apply a modifier to the outer surface of the processed food. For example, if the food is poultry or ham, it may be desirable to impart smoke color and flavor to the cooked poultry or ham outer surface. This of course may be accomplished in a separate step by placing the processed food in a smoke house. For distribution this requires removal of a smoke-permeable enclosure from the smoked, processed food body and repackaging in an oxygen barrier type film enclosure for extended shelf life.

It would be desirable to provide a film article which can be used as an enclosure for processing enclosed food and also as a vehicle for simultaneously transferring modifiers such as liquid smoke to the food surface during processing.

Various problems have been encountered in attempts to provide such a film article. For example, powdered smoke concentrate was added to the inside surface of the inner EVA layer of an oxygen barrier type multilayer film of the type described in the aforementioned Lustig et al Patent. Hams processed in bags fabricated from this film had a moderate smoke flavor but the smoke color on the processed ham outer surface was highly non-uniform because the powder tended to accumulate in pockets on the ham surface during stuffing.

Another approach was to blend commercially available smoke-flavored polymer concentrates with the EVA resin used as the inner layer of the Lustig et al type coextruded multilayer film. Cook-in tests using bags fabricated from film with this inner layer blend did not transfer smoke color or flavor to the processed ham. Similarly there was no smoke color or flavor transfer to low fat meat bologna processed in casings prepared from this film.

Still another attempt to prepare a film with a transferable modifier involved melt blending a glycerine-based liquid smoke concentrate with the EVA resin used as the inner layer of the multilayer film. This caused the primary film discharged from the extruder to delaminate before biaxial orientation. Orientation was not possible.

A further approach was to mix equal weights of liquid smoke concentrate and powdered silica, then melt blending the liquid smoke-loaded powder with the EVA resin used as the film inner layer. Silica is of course a well-known absorbent. A multilayer film of the vinylidene chloride oxygen barrier type was produced having a smoke odor. However, very little smoke color or flavor was transferred to meat during cook-in tests using bags fabricated from this film.

A difficulty with these approaches was that for these tests the modifier was wood-derived smoke, and at extrusion temperatures for these particular multilayer films (about 350° F.), the odor and taste components of the smoke are volatile and reactive, and do not survive extrusions in sufficient quantity to impart color or flavor to meat.

Accordingly, in other tests well-known absorbents such as starch, gypsum and thermoset crosslinked water soluble resin were blended with the EVA resin, and the multilayer film was coextruded. Then the film was contacted with liquid smoke for absorption thereby. However, the liquid smoke absorbency of these EVA-absorbent blend inner layer-type films was so low that transfer in the presence of water to contiguously associated surfaces for example food bodies, would be negligible.

An object of this invention is to provide an extruded film article containing a modifier such as a colorant or a fragrance or a colorant-fragrance such as liquid smoke, which is transferable from the film to a surface such as a food body outer surface enclosed by the film.

A further object of the invention is a method for making such a modifier-transferable film article.

Another object is to provide an enclosure such as a casing or bag, fabricated from the extruded film article, which will transfer the modifier to the outer surface of a body encased in the enclosure and in fluid association with the film inner surface.

A still further object is to provide a processable food package comprising a multilayer oxygen barrier type film enclosure containing a modifier, the enclosure being filled with processable food, wherein the modifier is transferable from the film enclosure to the food outer surface during insitu processing.

Still another object is a method for making a modified food package of the type hereinabove described.

Other objects and advantages of the invention will be apparent from the ensuing disclosure and appended claims. As will be explained hereinafter, this invention achieves all of the aforedescribed objects in an unexpected and efficient manner.

SUMMARY OF THE INVENTION

Olefinic oxide polymers such as poly (ethylene oxide) with molecular weights of at least about 70,000 and up to about $5 \times 10^6$ are dry, free-flowing white powders, completely soluble in water at temperatures up to about 98° C. They have crystalline melting points from 63° to 67° C. The chemical structure of poly (ethylene oxide) resin is

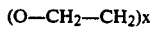

Because of the very high molecular weights of these resins, the concentrations of reactive end groups is extremely small, so there is no end group reactivity.

Poly (ethylene oxides) are used as thickening agents in water and will reduce the turbulent frictional drag of the water in which they are dissolved by up to 80%.

Poly (ethylene oxide) is known as an additive to thermoplastic films to promote biodegradability. It is susceptible to severe auto-oxidative degradation and loss of viscosity in aqueous solutions.

According to the *Handbook of Water-Soluble Gums and Resins* by Robert C. Davidsons, (published by McGraw-Hill Book Company, 1980) the mechanism involves the formation of hydroperoxides that decompose and cause cleavage of the polymer chain. The rate of degradation is increased by heat, ultraviolet light, strong acids, or certain transition metal ions.

Accordingly, to the best of our knowledge olefinic oxide polymers have not heretofore been used in thermoplastic films to be extruded, wherein the olefinic oxide polymer is included to perform an absorption function in the extruded film.

Nevertheless it has unexpectedly been discovered that olefinic oxide polymers may be blended with certain types of thermoplastic polymers and extruded to form water swellable films. A modifier (hereinafter defined) is either also blended with the olefinic oxide polymer and thermoplastic polymer prior to film extrusion or absorbed into the as-extruded film. The modifier is transferable from the film to a receiving surface in fluid transfer relationship with the film. More particularly, this invention in its article aspect comprises a blend of a thermoplastic polymer and olefinic oxide polymer, and a modifier absorbed in said blend. The modifier is transferable from the film to a receiving surface. The film and receiving surface are preferably in contiguous association and the transfer is preferably in the presence of water. Suitable receiving surfaces include meat, poultry, carbohydrate and cheese.

Another aspect of the invention is a thermoplastic bag formed of an extruded film comprising a blend of a thermoplastic polymer and an olefinic oxide polymer, and a modifier absorbed in the blend. The modifier is transferable from the film to a product receiving surface within the bag. Alternatively, a thermoplastic casing may be formed from the same extruded film, with the modifier being transferable from the film to a product surface within the casing.

A preferred thermoplastic casing is formed of extruded multilayer film including a core-barrier layer and a blend second layer adhered to the inside surface of the core layer. This second layer comprises a polyolefin first constituent and poly (ethylene oxide) second constituent of at least about 70,000 average molecular weight having wood-derived liquid smoke absorbed in the blend. The color and flavor of the liquid smoke are transferable from the multilayer film to a contiguous food product receiving surface within the casing in the presence of surrounding heated water. A polyolefin third layer is adhered to the outside surface of the core layer. In a most preferred embodiment the aforedescribed thermoplastic casing is shirred.

Also contemplated is a processable food package comprising the aforedescribed extruded film as an enclosure and filled with processable food having its outer surface in fluid transfer relationship with the film enclosure inner surface. The modifier is transferable from the film enclosure to the food outer surface during processing of the food in the film enclosure.

The invention also includes a method for making a modifier-transferable film article wherein a resin blend is provided comprising a thermoplastic polymer and an olefinic oxide polymer. The resin blend is extruded into a film. A modifier is absorbed into the blend.

Finally, the invention contemplates a method for making a modified food package wherein the aforedescribed extruded film article is provided and filled with processable food such that the food outer surface is in fluid transfer relationship with the modifier-containing film. The food-containing package is processed at elevated temperature to cook the food and simultaneously transfer the modifier from the film package to the food outer surface.

DETAILED DESCRIPTION

The thermoplastic polymer of this invention may for example be a polyolefin, and prepared from copolymers of two or more olefins such as polyethylene and higher alpha olefins for example the $C_3$ to $C_{10}$ types or copolymers of olefins and another hydrocarbon as for example ethylene vinyl acetate (EVA), ethylene acrylic and (EAA), or blends thereof. The former include polypropylene, low density polyethylene (LDPE), linear low density polyethylene (LLDPE), and very low density polyethylene (VLDPE) sometimes referred to as ultra low density polyethylene (ULDPE).

Linear low density polyethylene (LLDPE) refers to copolymers of ethylene with one or more comonomers selected from preferably $C_4$ to $C_{10}$ alpha-olefins such as butene-1, octene, in which long chains of copolymer are formed with relatively few side chain branches or crosslinking. The degree of branching is less than that found in typical conventional low or medium density polyethylene. LLDPE may also be characterized by the known low pressure, low temperature processes used for their production. LLDPE is known to have a density between about 0.91 and 0.93 grams per cubic centimeter and a melting point of approximately 120° C. VLDPE is a copolymer of ethylene and at least one comonomer selected from $C_4$ to $C_{10}$ alpha-olefins and having a density between about 0.86 and 0.91 g/cc and a melting point of about 120° C.

EVA is a copolymer of ethylene and vinyl acetate, and is the preferred polyolefin as the thermoplastic polymer in the practice of this invention. For reasons explained hereinafter, the EVA more preferably has a vinyl acetate ("VA") content of between about 12 and about 16 wt %. This VA content may be provided by a single material or may be the weighted average of at least two different EVAs having different VA contents. In particular, the polyolefin may be a blend of a first EVA having a vinyl acetate content of less than about 24 wt % and a second EVA having a vinyl acetate content lower than the first EVA but more than about 8 wt %. This EVA blend even more preferably comprises between about 40 and about 60 wt % of the first EVA and between about 40 and about 60 wt % of the second EVA.

For increased physical strength as for example higher puncture resistance, it may be desirable to employ a blend of different polyolefins as the thermoplastic polymer of this invention, for example a blend of ethylene vinyl acetate and polyethylene. The latter may for example be LLDPE or VLDPE. A preferred polyolefin blend comprises EVA having between about 8 wt % and about 24 wt % vinyl acetate, wherein the EVA comprises between about 70 wt % and about 90 wt % of the blend with the polyethylene comprising between about 10 wt % and about 30 wt % very low density polyethylene.

The thermoplastic polymer of this invention may also for example be a polyurethane, an ionomer, a polyamide, a polyester or a vinylidene chloride copolymer (saran) as for example the vinyl chloride or methyl acrylate comonomers. These sarans function as barriers for oxygen transfer and are commonly used in food packaging for this purpose. Polyamides (nylons) and hydrolyzed ethylene vinyl acetate (EVOH) are also oxygen barriers and may be used alone as the thermoplastic polymer in the instant film article, or as the core layer oxygen barrier in a multilayer film wherein another layer adhered thereto comprises the essential thermoplastic layer. As still another variation, the core-oxygen barrier layer may be an ethylene vinyl alcohol-polyamide blend.

The thermoplastic polymer is present in a blend with an olefinic oxide polymer which is preferably a homopolymer and most preferably poly (ethylene oxide). The latter preferably has an average molecular weight of at least about 70,000 because the melting point and water absorptivity are in ranges particularly suitable for blending and extruding with other constituents, especially the thermoplastic polymer, thereby forming a blend which itself is an effective absorbent. The average preferably about 100,000 for the same reasons.

As used in this specification and claims, "average molecular weight" of poly (ethylene oxide) means approximately weight-average molecular weights derived from rheological measurements, as described in Table B, page 3 of Union Carbide Corporation's Brochure F-42933 entitled "Polyox Water Soluble Resins", published May 1970.

The olefinic oxide polymer preferably comprises at least about 10 wt % of the blend because this concentration is desired to in turn assure that enough modifier is absorbed for effective transfer to the receiving surface. Most preferably the olefinic oxide polymer comprises between about 15 wt % and about 40 wt % of the blend. Higher percentages are not preferred because of blending difficulties and loss of desired film properties. As a result, the physical properties of such excessively high olefinic oxide homopolymer content film such as tensile strength, tear resistance and adhesion to adjacent films would tend to degrade.

In general, various conventional additives such as slip agents, anti-blocking agents and pigments can be incorporated in the film article of this invention, as is well known in the art.

A modifier is absorbed in the blend, i.e., primarily in the olefinic oxide polymer, and is transferable from the film to a receiving surface in fluid transfer relationship with the film. As used herein, "modifier" means a substance that effects a change or modification of the receiving surface to which it is transferred.

By way of nonlimiting illustration the modifier may be a colorant i e., a substance that uppn transfer, colors the receiving surface. Suitable colorants include water-soluble dyes such as the FD&C colors or lakes. The latter are pigments formed by precipitation and absorption of a dye on an insoluble base. Most commonly they are prepared from aluminum hydrate and organic dyes, i.e. the dye is absorbed on the hydrate. Suitable lakes for use as modifiers in this invention are for example obtained from Warner-Jenkinson Company, St. Louis, Missouri.

Another type of suitable modifiers are fragrances, for example vanillin, clove, orange or citric extract and 5' nucleotides such as inasine monophosphate. These substances do not necessarily impart color to the receiving surface but transfer fragrance, i.e., odor thereto.

Still another type of suitable modifiers are flavorents, i.e., substances transferring taste (not necessarily odor) to the receiving surface as for example reducing/nonreducing sugars, autolyzed yeast extracts and acidulants.

A further type of suitable modifiers are colorant-fragrances, i.e., substances which transfer both color and fragrance to the receiving surface, as for example wood-derived liquid smokes. The following is a representative list of such materials, the preferred types having a total acid content of at least about 10% to assure substantial transfer of color and fragrance to the receiving surface.

| Commercially Available Wood-Derived Liquid Smokes | | | |
|---|---|---|---|
| Manufacturers Designation | Total Acid Content (e) % | Total Solid % | Absorptive Power (d) |
| Super Smoke (f) | 15.5–16.5 | 25–26 | 1.3 |
| Zesti Smoke Code-12 (f) | 12.0 | 10 | 0.60 |
| Royal Smoke AA (a) | 11.5–12.0 | (about) 10.2 | 0.68 |
| Royal Smoke A (a) | 10.5–11.0 | 9.0 | 0.42 |
| Royal Smoke B (a) | 8.5–9.0 | 8.8 | 0.36 |
| Royal Smoke 16 (a) | 10.0–10.5 | 17.6 | 0.62 |
| Charsol C-12 (b) | 12.0–12.5 | 8.3 | 0.54 |
| Charsol C-10 (b) | 11.5 | not reported | 0.40 |
| Smokaroma Code-12 (c) | 12.0 | 10.5 | — |

(a) Griffith Laboratories, Inc. 12200 South Central Ave. Alsip IL.
(b) Red Arrow Products Co., P.O. Box 507, Manitowoc, WI.
(c) Meat Industry Suppliers, Inc. 770 Frontage Rd. Northfield IL.
(d) Measured at 340 nm
(e) Also referred to as "Total Acidity"
(f) Hickory Specialities Co., Crossville, TN.

Still another type of modifier are antioxidants which are used to control rancidity of foods, as for example butylated hydroxy toluene, tocopherols and propyl gallate.

Modifiers also include antimycotic agents which are used to control mold growth in foods; these include glycerine, propylene glycol, potassium sorbate and parahydroxy benzoic acid. Other suitable modifiers include biocides such as nisin, lysozyme and enzymes.

Other types of modifiers include odor absorbents such as sodium citrate, epoxidized soy bean oil and hydrotalcite.

Another type of modifier is a surface energy modifier to achieve proper wetting of the receiving surface, as for example surfactants such as mono and diglycerides of fats and oils. These compounds may be ionic or non-ionic.

The aforedescribed thermoplastic polymer-olefinic oxide homopolymer preferably comprises one layer of a multilayer film wherein the layers are adhered to each other. The latter in turn preferably comprises at least three layers including a core oxygen barrier layer, the blend layer on one side of the barrier layer, and another layer formed of thermoplastic material on the other side of the core-oxygen barrier layer. This multilayer films is either extruded as or fabricated into a package as for example a casing or a bag capable of holding a body having an outer surface in fluid transfer relationship with the film inner surface for transfer of the modifier from the film to the body outer surface. Accordingly, the aforedescribed thermoplastic polymer-olefinic oxide polymer blend with an absorbed modifier is the inner layer of the multilayer film.

The multilayer film of this invention embodiment can be produced by known techniques such as by coextruding the multiple layers through an annular die into a tube. If a heat shrinkable film is desired, this tube may be biaxially stretched in accordance with the conventional "double bubble" technique disclosed in Pahlke U.S. Pat. No. 3,456,044. Alternatively, the films may be fabricated by extrusion coating, wherein a base tube is extruded and succeeding layers are surface coated on the base tube in a manner such as that disclosed in the aforementioned U.S. Pat. No. 3,741,253 to Brax et al. Also, the multilayer film may be slot cast and biaxially stretched by tentering before the resulting sheet is fabricated into bags or casings. Still further, the inventive multilayer film may be fabricated by producing separate layers and then laminating the layers together. The present invention contemplates blown films as well as uniaxially or biaxially oriented films.

The preferred heat shrinkable multilayer film of this invention will generally have a total thickness of from about 1.75 mils to about 4.0 mils, and preferably of from about 2.0 mils to about 4.0 mils, because when the thickness of the multilayer film is more than 4.0 mils, clipping problems are encountered in that it is difficult to gather together the open end of a bag made therefrom. When the thickness of the multilayer film is less than 1.75 mils, the film will have diminished puncture resistance.

Although the invention will be specifically described in the form of a three layer film, in its broadest context only one layer is required. An oxygen barrier-type film, either as a single layer or as a core layer, is preferred for certain end uses as for example shrink wrapping fresh red meat or processed meat. On the other hand, oxygen barrier-type films are not normally used for shrink packaging poultry. More than three layers are also contemplated, for example, a five layer film comprising one outer layer of polypropylene or ethylene-propylene copolymer, another outer layer comprising thermoplastic polymer-olefinic oxide homopolymer blend, the aforedescribed vinylidene chloride copolymer as a barrier layer and an adhesive layer between each outer layer and the barrier layer.

If the preferred three layer film is heat shrinkable for food packaging, the first outer layer will preferably have a thickness of from about 1.1 mils to about 2.0 mils; the core layer will preferably have a thickness of from about 0.20 mil to about 0.45 mil; and the second outer layer will preferably have a thickness of from about 0.4 mil to about 1.5 mils. The thickness of the first outer layer, which is the inner layer of the bag, is preferably within the aforementioned range because the sealing and processability properties of the film layer would otherwise be diminished. The thickness of the core layer is preferably within the above-indicated range because the film would provide inadequate barrier properties if the core layer thickness is less than about 0.20 mil. The preferred upper limit of 0.45 mil for the core layer is based on the barrier effectiveness needed for intended uses of the multilayer film. The thickness of the second outer layer, which is the outer layer of the film, is preferably in the aforementioned range to provide desired toughness and puncture resistance and also keep the total thickness of the film in the range from about 1.75 mils to about 4.0 mils.

When the vinylidene chloride copolymer is or includes the vinyl chloride copolymer and biaxial orientation is desired, the latter's molecular weight preferably is at least about 75,000 to readily achieve biaxial orientation and film toughness, and up to about 135,000 for ease of extrudability. The most preferred range is between about 120,000 and about 130,000 molecular weight. Also, the vinyl chloride content in the copolymer is preferably between about 10 weight percent for ease of extrudability and up to about 35 weight percent for maximum barrier properties, the most preferred range being between 15 and 30 weight percent vinyl chloride.

When the vinylidene chloride copolymer is or includes the methyl acrylate copolymer, the latter s molecular weight is preferably at least about 75,000 to readily achieve the desired biaxial orientation and film toughness, and up to about 130,000 for ease of extrudability. The most preferred range is between about 90,000 and about 110,000 molecular weight. Also, the methyl acrylate content in the copolymer is preferably between about 5 weight percent for ease of extrudability and up to about 15 weight percent which is the U.S. Federal Food and Drug Administration's limit. The most preferred range for methyl acrylate content is between about 6 and about 10 weight percent in the copolymer with vinylidene chloride.

The vinylidene chloride copolymer layer of the inventive film may also comprise a blend of two copolymers. As for example described in Schuetz U.S. Pat. No. 4,798,751, a suitable blend may be vinylidene chloride-methyl acrylate copolymer and vinylidene chloride-vinyl chloride copolymer, with between about 2.9 and about 13.5 weight percent methyl acrylate and between about 2.9 and about 11.6 weight percent vinyl chloride. This blend provides a balance between no significant discoloration on irradiation or exposure to elevated temperature for sustained periods, and avoidance of processing difficulties during manufacturing.

The vinylidene chloride copolymer core layer preferably contains less than 5 weight percent plasticizer, the percentage being based on the total weight of the blend of copolymers and all additives including plasticizer, in order to maximize the barrier properties of the thin film. Conventional plasticizers such as dibutyl sebacate and epoxidized soybean oil can be used.

To manufacture the present film article, the thermoplastic polymer and olefinic oxide homopolymer are first thoroughly mixed preferably in resin form to form a substantially uniform blend. If the modifier is extrudable without decomposition or vaporization under the elevated temperature extrusion conditions, it is also intimately mixed with the other blend constituents.

The resins and any additives are introduced to an extruder (generally one extruder per layer) where the resins are melted by heating and then transferred to the coextrusion die for formation into a tube. Extruder and die temperatures will generally depend upon the particular resin or resin-containing mixtures being processed and suitable temperature ranges for commercially available resins are generally known in the art, or are provided in technical bulletins made available by resin manufacturers. Processing temperatures may vary depending upon other process parameters chosen. In coextrusion, barrel and die temperatures, for example, may range between about 175° C. and 250° C. (347° F. and 482° F.). However, depending upon the manufacturing process used and particular equipment and other process parameters utilized, variations and actual process parameters including process temperatures will be set by one skilled in the art without undue experimentation.

The entire multilayer film of this invention is preferably irradiated at dosage of at least about 2 MR. If the film is biaxially oriented for heat shrinkability, the irradiation step preferably follows the biaxial orientation step. As explained in Lustig et al. U.S. Pat. No. 4,737,391, this post-irradiation sequence is preferred because the film to be irradiated is much thinner than the nonoriented film, so the same degree of cross-linking can be achieved at lower voltage than with the unstretched film. Using post-irradiation the multilayer film of this invention is preferably irradiated to a dosage level of between about 1 megarad and about 5 megarads, and most preferably between about 2 megarads and about 4 megarads, by any suitable method such as by employing an electron beam. When the energy level is below the indicated range, sufficient cross-linking is not obtained to improve the heat sealing characteristics and toughness properties of the multilayer film. When the energy level is above the aforementioned range, the degree of the film shrinkage is significantly reduced and further improvements in the heat sealing characteristics and toughness properties of the film are not achieved.

The modifier is absorbed into the blend either before or after film extrusion depending primarily on whether the modifier will be affected by the extrusion conditions and whether the modifier will adversely affect extrudability of the other film constituents, in particular at the high temperature on the order of 350° F. If it does not volatilize and/or decompose at this temperature level it may be first contacted with the olefinic oxide polymer for absorption, and the modifier-containing olefinic oxide polymer then blended with the thermoplastic polymer for extrusion.

If however the modifier or the other film constituents would be affected by the extrusion conditions, the modifier must be introduced to the as-formed film. If the latter is formed as a flat sheet it may be immersed in a modifier-containing bath for absorption by the olefinic oxide polymer. If the sheet is extruded as a tube, the modifier may be contacted with the tube inner surface and absorbed thereby. The most commonly used procedure for accomplishing this is by slugging as for example described in Underwood et al U.S. Pat. No. 2,901,358 and Gerigk et al U.S. Pat. No. 3,693,583. As well understood by those skilled in the art, a slug of the modifier-containing liquid is introduced at a low position in the tube processing system, usually with at least a nip roll as a liquid seal at the lower end. A nip roll may also be provided as the upper end of the vertical flow path to prevent liquid carryover. The inflated tube is then passed through the stationery liquid slug for absorption of the modifier.

If the film is fabricated into a bag, the modifier may be added by simply filling the bag and after absorption into the film wall, draining or pressing excess modifier-containing solution from the absorptive surface.

Film packages such as bags may for example be produced from the film of this invention by heat sealing. For instance, if the film is produced in the form of tubular film, bags can be produced therefrom by heat sealing one end of a length of the tubular film or by sealing both ends of the tube, then slitting one edge to form the bag mouth. If the film of this invention is made in the form of flat sheets, bags can be formed therefrom by heat sealing three edges of two superimposed sheets of film. When carrying out the heat sealing operation, the surfaces which are heat sealed to each other to form seams are the aforedescribed inner layers of the films of the invention. Thus, for example, when forming a bag by heat sealing one edge of a length of tubular film, the inner surface of the tube, i.e., the surface which will be heat sealed to itself, will be the inner layer of the multilayer film embodiment.

For transfer of modifier from the extruded film to the contiguous receiving surface, a physical contacting relationship is preferably provided between the modifier-containing olefinic oxide polymer and thermoplastic polymer film blend, and the receiving surface. This may for example be accomplished during the conventional shrink packaging of a heat-shrinkable film around a body as for example a processable food such as ham or poultry. Alternatively, if the film is not heat shrinkable it may be wrapped around the contiguous receiving surface as a sheet. If in bag or casing form, it may be evacuated and collapsed against the contiguous receiving surface and sealed.

There must be a driving force for transfer of the modifier from the film to the receiving surface, and this is at least in part provided by a difference in modifier concentration, i.e., concentration gradient, and by diffusion. A carrier such as water is also preferred but not essential. Modifiers such as fragrances and taste modifiers may have sufficient vapor pressure to diffuse from the film to the receiving surface without using a carrier such as water. In some systems, vapor transport of the modifier from the film to the receiving surface may be effected by surface-air-surface diffusion, thereby obviating the need for contiguous contact between the film and the receiving surface.

It will be recognized by those skilled in the art that the modifier-to-receiving surface transfer efficiency depends on a number of factors. In general, the transfer is more efficient if there is contiguous contact between the modifier-containing film and the receiving surface. Other factors include the modifier boiling point and vapor pressure, the modifier loading in the film, temperature-time relationship of the system during transfer, the modifier absorptivity of the receiving surface and the film-receiving surface distance if there is no contiguous relationship. In general, a higher transfer rate and modifier loading in the receiving surface is achieved if the modifier boiling point is relatively low, its vapor pressure is relatively high, the modifier loading in the film is relatively high, the system temperature during transfer is relatively high and maintained for a relatively long period, the receiving surface absorptivity for the modifier is relatively high, and the film-to-receiving surface flow path is relatively short and unobstructed. In preferred practice, water is present at the film-receiving surface interface as a carrier for the modifier transfer. This is usually provided by the moisture content in edible bodies if they form a receiving surface. Water is preferred as a carrier because the olefinic oxide polymer itself is water soluble, and the modifier must be released therefrom for transfer to occur. Stated otherwise, moisture weakens the modifier-olefinic oxide polymer bond and accelerates movement of the modifier across the film interface to the receiving surface. In some instances the modifier itself provides the water, for example wood-derived liquid smoke. If the modifier or receiving surface does not contain moisture, the latter may be provided from an external source.

The receiving surface itself is preferably a porous material such as food, to more readily receive and retain the modifier. Nonporous surfaces are difficult to penetrate in terms of transferring modifiers thereto from the olefinic oxide polymer-thermoplastic polymer blend. Among the food bodies which have been successfully tested as receiving surfaces in the practice of the invention are the following: ham, poultry (turkey), swiss cheese and american cheese. A cardboard cylindrical core has also been successfully demonstrated as a receiving surface to simulate nonfood surfaces. If the receiving surface is contiguously associated with the film, the former should preferably be flexible so that it may be readily contoured to the film surface for good physical contact across the entire exposed surface areas.

It is preferred to effect the modifier-to-receiving surface transfer at elevated temperature, as for example during the processing of edible food such as meat and poultry inside the film package. There are at least two reasons for this preference. First, the elevated temperature increases energy and hence mobility of the water which accelerates release of the modifier from the olefinic oxide homopolymer. Secondly, the elevated temperature increases activity and energy of the modifier molecule itself, thereby accelerating its movement toward the receiving surface and in the direction of lowest concentration of the modifier. Notwithstanding the preference for an elevated temperature environment, it has been demonstrated that modifiers may be transferred from the olefinic oxide homopolymer across the film interface to the contiguous surface at ambient temperature.

The invention will be more fully understood by the ensuing examples.

EXAMPLE 1

A series of tests were conducted to determine the liquid smoke absorbency in blown (nonoriented) monolayer films formed of ethylene vinyl acetate. Various absorbents were added to the EVA resin to be extruded. Liquid smoke was added to the extruded film and the absorbency measured.

The liquid smoke used in this and all succeeding examples was type H-16 sold by Hickory Specialties Company and manufactured by partial oxidation of wood to produce an "as is" or tar-containing mixture having 50% water content and 16% total acid content. The EVA was type DQDA 6833 sold by Union Carbide Corporation and has a vinyl acetate content of 10 wt % and melt index of 0.25. The poly (ethylene oxide) used in these tests and all succeeding examples was Polyox WRSN 10 manufactured by Union Carbide Corporation in powder form and having a molecular weight of 100,000, being totally water soluble (hereinafter referred to as "Polyox"). The starch absorbent was Polygrade II manufactured by Ampacet Chemical Company. This is a starch-linear low density polyethylene blend with a small concentration of a pro-oxidant, the starch comprising 40 wt % of the total mixture.

The experimental procedure was to immerse preweighed film swatches in a liquid smoke bath for two minutes, pat the liquid smoke sample lightly to visual dryness and reweigh, all at ambient room temperature.

As used in this and all ensuing examples, the weight percent of a modifier in a film refers to the base weight of the film, i.e., without the modifier, unless stated otherwise.

The results of these absorbent screening tests are summarized in Table A.

TABLE A

| | Absorbent Screening Tests | | |
|---|---|---|---|
| Sample No. | Film Composition | Liquid Smoke Absorbency (wt %) | Film Thickness* (mils) |
| 1 | EVA control | 0.5 | 3.5 |
| 2 | 5% Polyox-95% EVA | 1.0 | 3.5 |
| 3 | 10% Polyox-90% EVA | 1.0 | 3.5 |
| 4 | 20% Polyox-80% EVA | 3.9 | 6.0 |
| 5 | 6% starch-94% EVA | 1.1 | 3.0 |
| 6 | 10% starch-90% EVA | 1.3 | 3.0 |
| 7 | 5% Polyox, 6% starch, 89% EVA | 2.1 | 3.2 |

*After liquid smoke absorption

Table A shows that if poly (ethylene oxide) is blended in sufficient quantity with EVA, the resulting film will absorb at least seven times as much liquid smoke as the same film without this particular absorbent. In particular, Sample 4 (20% Polyox) had 3.9 wt % liquid smoke whereas Sample 1 (no Polyox) had only 0.5% liquid smoke. In contrast, starch by itself (a well known absorbent) provided very little liquid smoke absorbency, but when blended with the Polyox resin a much higher absorbency was obtained per Sample 7.

In these tests it was also attempted to prepare a monolayer film using a blend of EVA and Union Carbide's Polyox WRSN 750, the latter being a poly (ethylene oxide) with a 300,000 molecular weight. Because a bubble could not be maintained, this blend could not be extruded into a film with the particular test extruder used in these experiments. It is possible that with an extruder having a longer melt flow path and more precise temperature control, blending would be more effective and a film could be formed.

Another additive tried was Nalco Chemical Company's type 1181 which is a starch based absorbent consisting of a thermoset crosslinked water soluble resin. Extrusion with EVA was unsuccessful, resulting in many film gels.

Also tested was the addition of gypsum (hydrated calcium sulfate) to the EVA resin at several different loadings. Gypsum is a well-known absorbent. However, the best results (1.1 wt % liquid smoke using 1% gypsum—99% EVA) were far inferior to the best performing Polyox-containing Sample 4 (3.9 wt % liquid smoke).

EXAMPLE 2

Attempts were made to load more than 20% Polyox WRSN 10 into the EVA monolayer film of the type described in Example 1. If this were possible, the liquid smoke absorbency could be increased above the 3.9 wt % of Sample 4. These attempts using the Example 1 extruder were unsuccessful because the Polyox tended to plate out on the nip rolls of the blown film extruder.

For the foregoing reasons, other thermoplastic polymers were tested as substitutes for the EVA used in Example 1, and with the same extruder. These formulations were blended and extruded as monolayer films and immersed in the same liquid smoke for the same period as in Example 1.

TABLE B

Base Film Screening Tests

| Sample No. | Film Composition | Liquid Smoke Absorbency (wt %) | Film Thickness (Mils) |
|---|---|---|---|
| 8 | 20% Polyox, 80% polypropylene (a) | 3.7 | 3.3 |
| 9 | 20% Polyox, 80% acrylic acid (b) | 1.8 | 2.1 |
| 9A | 20% Polyox, 50% acrylic acid copolymer (b), 30% nylon (f) | 10.0 | 2.0 |
| 10 | 20% Polyox, 80% ionomer (c) | 2.8 | 2.1 |
| 11 | 20% Polyox, 80% VLDPE (d) | 1.2 | 2.0 |
| 12 | 50% Polyox, 50% VLDPE (d) | 17.5 | 2.6 |
| 13 | 20% Polyox, 80% EVA (19% VA) (e) | 7.7 | 1.9 |
| 14 | 30% Polyox, 70% EVA (18% VA) | 19.1 | 2.2 |
| 14A | 30% Polyox, 35% EVA (19% VA) 35% ULDPE (d) | 22.0 | 2.1 |
| 15 | 35% Polyox, 65% EVA (18% VA) | 22.4 | 2.2 |
| 16 | 40% Polyox, 60% EVA (18% VA) | 36.0 | 2.2 |
| 17 | 20% Polyox, 40% EVA (10% VA) 40% EVA (18% VA) (g) | 5.1 | 2.8 |
| 18 | 30% Polyox, 35% EVA (10% VA) 35% EVA (19% VA) | 22.9 | 2.8 |

The product designation and manufacturers of the Table B film components are as follows:
(a) Soltex 4209, Soltex
(b) Primacor 1410, (melt index=1.5) Dow
(c) Surlyn 8404, Du Pont
(d) Attane 4001, Dow
(e) Elvax 3165, DuPont
(f) W 6220, Emser Grilon
(g) DQDA 6833, Union Carbide In another monolayer blown film test, a blend of 17% Polyox 83% nylon (type W 6220 manufactured by Emser Grilon Company) was extruded into a flexible film of about 2.0 mils thickness and thereafter bonded with liquid smoke. The takeup was such that the film contained about 28.6% liquid smoke, thereby demonstrating that when blended with Polyox, high modifier loading may be obtained with thermoplastic polymer other than polyolefins.

There were compatibility and mixing difficulties with certain of these blends, in particular Polyox with polypropylene (Sample 8) and ultra low density polyethylene or ULDPE (Samples 11 and 12). The films tended to be very splitty and came apart in layers, however suitable films might be prepared from these blends with a longer extruder melt flow path and a more efficient mixing screw. The ionomer (Sample 10) and acrylic acid copolymer (Sample 9) blended well with Polyox but did not absorb liquid smoke nearly as effectively as the EVA, 10% VA film (Sample 4). Similar results to Sample 9 were obtained with Primacor 1470, an acrylic acid copolymer manufactured by Dow Company with relatively high melt index of 5 dg/min, i.e., the liquid smoke absorbency was only about 2 wt %.

Ethylene vinyl acetate was clearly the most effective liquid smoke absorbent among the thermoplastic materials used in these experiments. Higher absorbance values may in some instances be obtained by increasing the Polyox content and decreasing the thermoplastic content, provided that the mixture is extrudable. This is demonstrated by comparing Examples 11 and 12.

Table B also shows that the high vinyl acetate (18%) EVA film greatly improved liquid smoke absorbency due to an ability to incorporate more Polyox. That is, Sample 16 contained 40 wt % Polyox hence absorbed 36.0% liquid smoke. Its Polyox content was twice that attainable with 10% vinyl acetate EVA. However, the liquid smoke absorbency was surprisingly over nine times as much as the 20% Polyox-80% EVA having 10% VA (Sample 4).

Since 18% VA type EVA is difficult to biaxially orient and one intended use for the film article of this invention is shrink wrapping food products such as meats, blends of this EVA with 10% VA type EVA (as used in Example 1) were also tested. Sample 18 shows that high liquid smoke absorbency may be achieved because the EVA blend contained 30% Polyox.

The average vinyl acetate content of preferred Sample 18 was 14%. In a preferred embodiment of this invention the thermoplastic polymer is ethylene vinyl acetate having vinyl acetate content between about 12 and about 16 wt %. This may be provided by blending two different EVAs with different VA contents to result in a blend having a weight averaged vinyl acetate in this range as for example demonstrated by Sample 18. Alternatively the preferred VA content may be provided by a single EVA if such be commercially available.

EXAMPLE 3

Biaxially oriented, heat shrinkable multilayer films were prepared with EVA-10% vinyl acetate inner and outer layers and an oxygen barrier type core layer comprising a blend of 25 wt % vinylidene chloride-vinyl chloride copolymer with 29 wt % vinyl chloride, and 75 wt % vinylidene chloride-methyl acrylate copolymer with 8 wt % methyl acrylate. The inner layer was about 1.5 mils thick, the outer layer was about 0.67 mil thick and the core-barrier layer about 0.3 mil thick for all samples of this Example 3.

In addition to Polyox, Sample 21 inner layer contained 10% of the aforedescribed starch absorbent Polygrade II. Since starch comprised 40% of same, it constituted 4% by weight of the inner layer. The additives in Samples 20 and 21 were blended with the inner layer EVA resin and the three separate layers were coextruded and thereafter biaxially oriented using the afore described double bubble process. The multilayer film samples were shaped into the form of a pouch which was weighed and then filled with the aforedescribed liquid smoke. After a contact time of about 2 minutes the excess liquid smoke was drained and the absorbate-containing inner layer was patted dry.

This Example demonstrates a preferred film embodiment of the invention comprising a biaxially oriented and heat shrinkable multilayer extruded film comprising a vinylidene chloride copolymer core-barrier layer, a blend second layer adhered to one side of the core layer, and a third layer adhered to the other side of the core layer opposite to the one side and comprising ethylene vinyl acetate. The blend second layer comprises ethylene vinyl acetate and poly (ethylene oxide) of at least about 70,000 average molecular weight, with wood-derived liquid smoke absorbed by the blend after extrusion of the film. The liquid smoke color and flavor are transferable from the blend second layer to a contiguous receiving surface in the presence of water.

Before liquid smoke absorption, the samples were tested for physical properties and the results are summarized in Table C along with the smoke loading. Where two numbers are given, the first is the machine direction measurement (MD) and the second measurement (following the slash) is in the transverse direction (TD).

TABLE C

| | Multilayer Film Physical Properties[1] | | |
|---|---|---|---|
| Sample No. | 19 | 20 | 21 |
| Inner Layer Composition | 100% EVA control | 85% EVA 15% Polyox | 86% EVA 10% Polyox 4% Starch |
| Tensile Strength, psi | 5800/5800 | 6700/5300 | 5700/6400 |
| Elongation, % | 160/110 | 190/200 | 90/120 |
| Shrink @ 90° C., % | 25/37 | 29/40 | 26/38 |
| Shrink Force @ 90° C., gm/mil | 65/110 | 60/95 | 70/145 |
| Residual Shrink Force @ Room Temperature, gm/mil | 50/65 | 55/85 | 40/85 |
| Hot H2O Puncture, Sec. | 120+ | 120+ | 5.4 |
| Haze, % | 4.5 | 21.4 | 44.2 |
| Gloss, H.U. | 79.1 | 49.0 | 48.6 |
| Flat Width, in. | 11-3/16 | 10-13/16 | 11-3/16 |
| Liquid Smoke Absorption in Pouch, % | 0.7 | 5.5 | 4.2 |

[1]Physical properties were measured before smoke absorption

Sample 20 with 15% Polyox retained more liquid smoke than control Sample 19 or Sample 21 with 10% Polyox and 4% starch. All of the Sample 20 physical properties were comparable to control Sample 19 except for the optical properties. Sample 20 also was more prone to delamination than control Sample 19.

To test liquid smoke transfer from these film types to meat surfaces, bags were fabricated from the multilayer films (without the aforedescribed liquid smoke absorption) and then loaded with 20% by bag weight liquid smoke (or liquid smoke blends) and heat sealed to prevent loss of the liquid. Three different solutions were used with each of the three inner layer types listed in Table C for Samples 19-21. Two of the solutions were identical and comprised only liquid smoke. The third solution was a blend of about 33% dissolved caramel, about 33% lanolin (for thickening) and the remainder liquid smoke. The 10% liquid absorption level was selected as being sufficient to achieve uniform absorption in the film inner layer inside wall, yet dryness by touch. The bags were stuffed with sweet pickled ham in sufficient quantity for contiguous contact with the multilayer film's inner layer inside surface when the film was heat shrunk around the meat's outer surface. The hams were then steam cooked in the heat-shrunk bags.

The caramel/lanolin/liquid smoke blend gave a splotchy appearance to the meat, which was considered unsuitable. Meat contacted with the liquid smoke-containing Sample 21 experienced meat adhesion because of the starch constituent. As the film was peeled back, pieces of meat came off with the film's inner layer and exposed fresh meat surface without liquid smoke coating. For this reason the starch-containing Sample 21 was also deemed unsuitable. In contrast, all of the meat bodies contacted with the Polyox-containing Sample 20 had a uniformly smoke colored and flavored outer surface.

This Example demonstrates a preferred processable food package of the invention wherein the thermoplastic polymer-olefin oxide polymer blend is one layer of a multilayer film comprising at least three layers, with the blend layer adhered to the inner surface of a core-barrier layer and having its inside surface in direct contact with the food outer surface. A polyolefin third layer adheres to the outside surface of the core layer.

EXAMPLE 4

Additional multilayer films of the general type described in Example 3 were prepared by the same coextrusion-double bubble process. Sample 22 was irradiated at dosage of about 4 MR after biaxial orientation and Sample 23 was nonirradiated. In addition to 20% Polyox in the EVA (10% VA) inner layer, Sample 22 included 1.2 wt % brown FD&C lake colorant manufactured by Warner Jenkinson Company (type 9385) in this layer. Lakes are pigments formed by precipitation and absorption of a dye (in this instance brown) on an insoluble base (in this instance aluminum hydrate). The brown lake was blended with the EVA-Polyox mixture and the film samples were a tinted bronze color. Sample 23 had an inner layer comprising 35% EVA (10% vinyl acetate), 35% EVA (18% vinyl acetate) and 30% Polyox.

Their physical properties were measured and are summarized in Table D.

TABLE D

| Lake-Containing Multilayer Film Physical Properties | | |
|---|---|---|
| Sample No. | 22 | 23 |
| Irradiated @ 4 MR | Yes | No |
| Film Thickness, mils | 2.31 | 1.97 |
| Shrinkage @ 90° C., % | 23/28 | 36/41 |
| Shrink Force @ 90° C., g/mil | 110/120 | — |
| Residual Shrink Force, g/mil @ Room Temperature | 80-105 | — |
| Hot H2O Puncture, sec. | 120+ | — |
| Haze, % | — | 64 |
| Gloss, Hunter Units | — | 35 |

EXAMPLE 5

Bags were formed from the biaxially oriented, heat shrinkable and irradiated Sample 22 multilayer film having an EVA layer containing 20% Polyox and 1.2% brown tint. One group of these bags was loaded with the aforedescribed liquid smoke at a level of 20% of the bag total weight. This was done in the aforedescribed manner, i.e., filling the bag with liquid and then draining excess liquid. Another group of the same Sample 22 bags was loaded to the same 20% bag total weight level with a 50/50 mixture of liquid smoke and methyl glyoxal. These are Samples 25-27.

The Sample 23 film-type bag was loaded in the same manner to a level of 40% bag ("high level") weight with liquid smoke and without tint (Sample 28). Other Sample 23-type bags were loaded in the same manner with a 50/50 mixture of liquid smoke and methyl glyoxal(Sample 29) to the same 40% bag weight.

The aforedescribed untinted, brown tinted, liquid smoke and liquid smoke-methyl glyoxal treated bags were hand stuffed with chunk ham, and then cooked insitu in a steam atmosphere to determine the transfer of color and flavor to the cooked ham outer surfaces. The cooking conditions were 145° F. for 1 hour, 155° F. for 1½ hours, and at 180° F. until a final internal temperature of 155° F. was reached. The cooked ham outer surfaces were examined and the results are summarized in Table E.

TABLE E
Use of Tinted Film

| Sample No. and Film Inner Layer | Appearance of Cooked Ham Surface |
|---|---|
| 24 clear, no smoke | no color change |
| 25 tinted, no smoke | slight purple-red tint |
| 26 tinted, smoke | slight purple-red tint to smoke color, splotchy and uneven |
| 27 tinted, smoke and methyl glyoxal | slight purple-red tint to smoke color, darker than Sample 26, somewhat splotchy and uneven |
| 28 clear, high level smoke | good smoked color |
| 29 clear, smoke and methyl glyoxal | good smoked color although somewhat splotchy |

After cooking, the outside color of the tinted bags i.e., Samples 24–27 with brown lake in the inner layer, were a plum color with a copper sheen. The outside color of clear bags with liquid smoke treatment, i.e., Samples 28 and 29, was a silvery gold. These samples also delaminated in areas and were very pliable. Liquid smoke appeared to accumulate in some of the delaminated areas of Samples 28 and 29. There were small droplets of liquid smoke on the inside surfaces of Samples 26 and 27. Based on visual comparison of the cooked ham outer surfaces, Sample 28 (Sample 23 film with high level liquid smoke loading) provided the most desirable smoke color and flavor.

This Example demonstrates preparation of an embodiment of the invention comprising a thermoplastic bag formed of extruded multilayer film. The latter includes a core-barrier layer, a blend second layer adhered to the inside surface of the core layer, and a polyolefin third layer adhered to the outside surface of the core layer. The aforementioned blend second layer comprises a polyolefin first constituent and a poly (ethylene oxide) second constituent of at least about 70,000 average molecular weight, wood-derived liquid smoke absorbed in the blend with the color and flavor of the liquid smoke being transferable from the multilayer films to a contiguous food product receiving surface within the bag in the presence of surrounding heated water.

EXAMPLE 6

A series of tests were conducted to demonstrate that the film article of this invention may be used to transfer colorant to poultry, and also compare the performance of same with a commercially available film, W. R. Grace's type CN 590 which is a multilayer type having a polypropylene inner layer.

The inventive film article used in these tests was the multilayer Sample 18 type wherein the inner layer comprised 30% Polyox, 35% EVA (10% VA) and 35% EVA (18% VA). Both the film article and the commercially available film were loaded in bag form with liquid smoke to provide an article containing about 28.6% liquid (total weight basis).

Liquid smoke was transferred to turkey by three different procedures: (1) the uncooked poultry was stuffed into the liquid smoke-containing bags which were evacuated, sealed and steam cooked, (2) cooked poultry breast roll was stuffed in the same type bags and steam heated at 180° F. for 10 minutes to simulate pasteurization, and (3) cooked poultry breast roll was stuffed in the same type bags and passed through a shrink tunnel at 195° F.

The turkey processed by procedure (1) in the inventive film article had even and dark smoke color with strong smoke flavor. The identically processed turkey from the commercially available film had some areas of dark smoke color and other areas of poor color. This was because the commercially available film lacked polyox so relatively little liquid smoke was absorbed and that available was not evenly distributed in or on the film. As a result it was not uniformly transferred to the turkey outer surface. The turkey processed by procedure (2) in the inventive film article also had even and dark smoke color with strong smoke flavor whereas the identically processed turkey from the commercially available film had uneven smoke color and flavor. The turkey processed by procedure (3) in general had less smoke color and flavor than that processed by procedure (2) because the smoke-poultry contact time at elevated temperature was much shorter. It was also observed that a large portion of the liquid smoke was still absorbed in the procedure (3) film's polyox, indicating that longer contact time at elevated temperature is needed for more effective transfer. Nevertheless the turkey processed in the inventive film article by procedure (3) had more pronounced smoke color and flavor than that processed in the commercially available film article.

EXAMPLE 7

This series of tests demonstrates that the inventive film article may be used to transfer color to food products other than meat or poultry, and for that matter to any type of porous body. The tests also demonstrate that at least for some porous bodies the transfer may be effected at low temperature. The film article used for these tests was the same type used in Example 6, the Sample 18 multilayer biaxially oriented and heat shrinkable film with an EVA inner layer containing polyox and 28.6% by weight liquid smoke. The liquid smoke was added to the films by slugging. In each instance the porous body was inserted in a bag formed from the film article, the package was evacuated and shrunk at 90° C. for 5 seconds. The packages were red at 40° F. for 24 hours prior to evaluation.

For Sample 30 the porous surface was swiss cheese, and for Sample 31 the porous surface was American cheese. For Sample 32 the porous surface was a cardboard cylindrical core. The results of these tests are summarized in Table F.

TABLE F
Cheese and Cardboard Transfer

| Sample No. | Recipient Body | Visual Result |
|---|---|---|
| 30 | Swiss Cheese | good color/flavor transfer; slight |

TABLE F-continued

| | Cheese and Cardboard Transfer | |
|---|---|---|
| Sample No. | Recipient Body | Visual Result |
| 31 | American Cheese | splotchy appearance good color/flavor transfer; slight splotchy appearance |
| 32 | Cardboard Core | good color/flavor transfer |

EXAMPLE 8

This series of tests was conducted to demonstrate manufacture of the inventive film article on full scale commercial equipment and at commercial production rates.

The film was a multilayer type comprising a 70.6% VLDPE, 25% EVA (18% VA) 4.4% processing aid concentrate outer layer (0.8 mils thick), a vinylidene chloride-methyl acrylate copolymer, vinylidene chloride-vinyl chloride copolymer blend core-barrier layer (0.3 mils thick) and an inner layer comprising a blend of 35% EVA-10% vinyl acetate, 35% EVA-18% vinyl acetate and 30% Polyox (1.7 mils thick). The film was coextruded and then biaxially oriented by the double bubble procedure into 9½ inch width tubes.

The modifiers used in these tests were the aforedescribed type H-16, and Charsol C-12 manufactured by Red Arrow Products Co. having a total acid content of 12.0–12.5%. Thus, Charsol C-12 is not as concentrated as liquid smoke type H-16 having an acid content of about 16%, dispersed in water.

The liquid smoke was absorbed into the Polyox-containing film inner layer by drawing the tube through an internal slug of the liquid at rates of 1000 fpm and 500 fpm. As understood by those skilled in the art, when slugging speed increases viscous drag forces also increase and this increases the rate of liquid smoke pickup. For example, at tube draw rate of 1000 fpm the liquid smoke pickup was 33.6 wt %. However, excess liquid smoke was visible throughout the film inner layer and when the excess was wiped off, about 26.9 wt % liquid smoke remained. At the lower draw rate of 500 fpm, the liquid smoke absorbency was 27% and after wiping with a cloth the liquid smoke loading was 26.2 wt %. The H-16 treated casings had a dark amber color and the Charsol C-12 treated casings had a bright straw color.

Because of the excess liquid smoke, there were strips of dark brown colored liquid smoke along the outer edges of the casings. These were in part due to the creases at the tube outer edges.

These liquid smoke treated casings were stuffed with chunk and form turkey (10 wt % moisture) and ham (40 wt % moisture). After being closed at the ends by clipping, the food packages were cooked in a steam atmosphere using the following heating program: 150° F. for 1 hour, 160° F. for 1 hour and 170° F. until the internal temperature of the meat reached 160° F. Then the food packages were showered with water at about 55° F. for 45 minutes.

The H-16 liquid smoke treated meat samples were dark and had a pleasantly strong smoke odor. All meat samples had the aforementioned dark strips transferred from the casing creases. The ham samples had a high level of "purge" water accumulating between the meat outer surface and the film. The turkey samples also had stripes and wrinkle dark lines, but little purge. There was no adhesion between the film and either the turkey or ham surfaces using H-16 liquid smoke.

The C-12 liquid smoke-contacted turkey and ham samples had a pleasant smoke odor and a slight color transfer compared to the control samples cooked in the same type bag without liquid smoke absorption. Purge water was less than with the H-16 liquid smoke samples. There was good adhesion between both types of meat surfaces and the film using C-12 liquid smoke, although considerably greater for ham than turkey.

EXAMPLE 9

This test was conducted to demonstrate that as long as an environment for fluid transfer relationship exists, the modifier may be transferred to a receiving surface which is not in contiguous, i.e., physical contacting relationship with the modifier-containing film The film was the same multilayer coextruded type used in Example 8 having an inner layer comprising a blend of 35% EVA (10% VA), 35% EVA (18% VA) and 35% Polyox. The modifier was liquid smoke type H-16 introduced by slugging, and comprised about 26.9% of the film total weight.

Hot water cooked turkey breast slices of about ⅛ inch thickness were placed in the bottom of a beaker having a volume of 100 ml and a diameter of 4 inches. The beaker mouth (12.5 in$^2$ surface) was covered by a small piece of the aforedescribed film with the inner layer on the underside facing the meat. The film-covered, turkey-containing beaker was placed in an oxygen barrier type heat shrinkable multilayer film bag to comprise a package, and cooked at 160° F. for 1 hour. The package was then placed in a refrigerator maintained at 40° F., and kept there for 48 hours.

At the end of the refrigeration period the turkey slices were removed for visual inspection, tasting and odor detection. There was a distinct smoke odor in the turkey slices as well as a smoke flavor. Because of the fluid transfer relationship therebetween, the liquid smoke modifier had transferred from the film to the turkey slices without direct physical contact. In this instance the liquid smoke modifier was released from the thermoplastic polymer-Polyox blend by heating the package and the resulting smoke vapor permeated the turkey slices.

EXAMPLE 10

This test was conducted to demonstrate that the modifier may be transferred to a receiving surface in the absence of water.

A blown (nonoriented) monolayer film was extruded having the following content: 30% EVA (10% VA), 30% EVA (18% VA), 30% Polyox and 10% AFT P 1138 smoke concentrate. The latter is a 30% smoke-in-oil flavor in Polyolefin composition obtained from Applied Fragrance Technologies, Inc. Accordingly, there was no moisture in this film which had a thickness of about 3.1 mils.

A white ceramic tile was wrapped with this film to form a package and the latter was placed in a bag formed of heat shrinkable oxygen barrier layer-type multilayer film. The bag was evacuated, sealed and shrunk at 90° C. for 5 seconds. After room temperature storage for 48 hours, the package was recovered and the tile examined. The tile had a distinct smoke odor and slight yellow color, thereby demonstrating transfer of the modifier smoke to the ceramic receiving surface in the absence of moisture.

While certain embodiments of this invention have been disclosed hereinabove, those skilled in the art will appreciate that changes and modifications may be made therein without departing from the spirit and scope of the invention.

What is claimed is:

1. An extruded film article consisting essentially of a blend of an ethylene copolymer and poly (ethylene oxide) having a weight-average molecular weight of at least about 70,000 and less than 300,000 with said poly (ethylene oxide) comprising between about 15 and about 40 wt. % said blend, and a modifier absorbed in said blend inside the film, said modifier being desorbable from said blend, movable to the film surface and transferable from said film to a receiving surface in fluid transfer relationship with said film.

2. An extruded film article consisting essentially of a blend of ethylene vinyl acetate (EVA), and poly (ethylene oxide) having an weight average molecular weight of at least about 70,000 with said poly (ethylene oxide) comprising between about 15 and about 40 wt. % of said blend, and a modifier absorbed by said blend, said modifier being transferable from said film to a receiving surface in fluid relationship with said film.

3. An article according to claim 2 wherein said EVA has a vinyl acetate content of between about 12 and about 16 wt %.

4. An article according to claim 3 wherein said ethylene-vinyl acetate comprises a blend of a first EVA having a vinyl acetate content of less than about 24 wt % and a second EVA having a vinyl acetate content lower than said first EVA but more than about 8 wt %.

5. An article according to claim 4 wherein the ethylene vinyl acetate blend comprises between about and about 60 wt % of said first EVA, and between about 40 and about 60 wt % of said second EVA.

6. An article according to claim 2 wherein said polyolefin is a blend of ethylene vinyl acetate and polyethylene.

7. An article according to claim 6 wherein said polyethylene is linear low density polyethylene.

8. An article according to claim 6 wherein said polyethylene is very low density polyethylene.

9. An article according to claim 6 wherein said ethylene vinyl acetate (EVA) has between about 8 wt % and about 24 wt % vinyl acetate, said EVA comprises between about 70 wt % and about 90 wt % of said blend, and said polyethylene comprises between about 10 wt % and about 30 wt % very low density polyethylene.

10. An extruded film article consisting essentially of a blend of polyamide and poly (ethylene oxide) having a weight-average molecular weight of at least about 70,000 and less than 300,000 with said poly (ethylene oxide) comprising between about 15 and about 40 wt. % said blend, and a modifier absorbed in said blend inside the film, said modifier being desorbable from said blend, movable to the film surface and transferable from said film to a receiving surface in fluid transfer relationship with said film.

11. An extruded film article consisting essentially of a blend of an ethylene copolymer and poly (ethylene oxide) having a weight-average molecular weight of about 100,000 with said poly (ethylene oxide) comprising between about 15 and about 40 wt. % of said blend, and a modifier absorbed in said blend inside the film, said modifier being desorbable from said blend, movable to the film surface and transferable from said film to a receiving surface in fluid transfer relationship with said film.

12. An article according to claim 1 wherein said modifier is absorbed by said blend after extrusion of said film.

13. An article according to claim 1 wherein said modifier is a colorant.

14. An article according to claim 1 wherein said modifier is a fragrance.

15. An article according to claim 1 wherein said modifier is a colorant-fragrance.

16. An extruded film article consisting essentially of a blend of a thermoplastic polymer and poly (ethylene oxide) having an weight average molecular weight of at least about 70,000 with said poly (ethylene oxide) comprising between about 15 and about 40 wt. % said blend, and wood-derived liquid smoke absorbed in said blend, said wood-derived liquid smoke being transferable from said film to a receiving surface in fluid relationship with said film.

17. An extruded film article comprising a blend of a thermoplastic polymer and an olefinic oxide polymer, and wood-derived liquid smoke having a total acid content of at least about 10%, said liquid smoke being absorbed in said blend and transferable from said film to a receiving surface in fluid transfer relationship with said film.

18. An article according to claim 17 wherein said liquid smoke comprises between about 10 wt % and about 40 wt % of said article.

19. An extruded film article comprising a blend of a thermoplastic polymer and an olefinic oxide polymer, and a biocide absorbed in said blend, said biocide being transferable from said film to a receiving surface in fluid transfer relationship with said film.

20. An extruded multilayer film wherein one layer consists essentially of a blend of ethylene vinyl acetate and poly (ethylene oxide) having a weight-average molecular weight of at least about 70,000 with said poly (ethylene oxide) comprising between about 15 and about 40 wt. % of said blend, and a modified absorbed in said blend inside the film, said modifier being desorbable from said blend, movable to the film surface and transferable from said film to a receiving surface in fluid transfer relationship with said film.

21. An extruded multilayer film article comprising at least three layers including a core-oxygen barrier layer, a blend layer on one side of said barrier layer comprising a blend of a thermoplastic polymer and an olefinic oxide polymer and a modifier absorbed in said blend, and another layer formed of thermoplastic material on the other side of said core-oxygen barrier layer, with said modifier being transferable from said blend layer to a receiving surface in fluid transfer relationship with said blend layer.

22. A multilayer film according to claim 21 which is biaxially oriented and heat shrinkable.

23. A multilayer film according to claim 21 wherein said core-oxygen barrier layer is a vinylidene chloride copolymer.

24. A multilayer film according to claim 21 wherein said core-oxygen barrier layer is ethylene vinyl alcohol.

25. A multilayer film according to claim 21 wherein said core-oxygen barrier layer is an ethylene vinyl alcohol-polyamide blend.

26. A multilayer film according to claim 21 wherein said thermoplastic polymer in said blend layer is polyolefin.

27. A multilayer film according to claim 22 wherein said thermoplastic polymer in said blend layer and said another layer are formed of polyolefin.

28. A multilayer film according to claim 27 which is biaxially oriented and heat shrinkable.

29. A biaxially oriented and heat shrinkable multilayer extruded film comprising a vinylidene chloride copolymer core-barrier layer; a blend second layer adhered to one side of the core layer and consisting essentially of a polyolefin first constituent, poly (ethylene oxide) second constituent of at least about 70,000 weight average molecular weight and comprising between about 15 and about 40 wt. % of said blend, and a modifier third constituent being absorbed in said blend second layer and transferable from said blend second layer of the multilayer film to a contiguous receiving surface in the presence of water; and a polyolefin third layer adhered to the other side of said core layer opposite to said one side.

30. A biaxially oriented and heat shrinkable multilayer extruded film comprising a vinylidene chloride copolymer core-barrier layer; a second layer adhered to one side of the core layer and comprising a blend of ethylene vinyl acetate and poly (ethylene oxide), and wood-derived liquid smoke absorbed by said blend after extrusion of said film and with the liquid smoke color and flavor being transferable from the second layer blend to a contiguous receiving surface in the presence of water; and an ethylene vinyl acetate third layer adhered to the other side of said core layer opposite to said one side.

31. A multilayer film according to claim 21 which is irradiated at dosage of at least 2 MR.

32. A thermoplastic bag formed of an extruded film consisting essentially of a blend of a thermoplastic polymer and poly (ethylene oxide) of at least about 70,000 weight average molecular weight with said poly (ethylene oxide) comprising between about 15 and about 40 wt. % of said blend, and a modifier absorbed in said blend, said modifier being transferable from said film to a product receiving surface within said bag.

33. A thermoplastic bag formed of extruded multilayer film comprising a core-barrier layer; a blend second layer adhered to the inside surface of the core layer and consisting essentially of a polyolefin first constituent and a poly (ethylene oxide) second constituent of at least about 70,000 weight average molecular weight with said poly (ethylene oxide) comprising between about 15 and about 40 wt. % of said blend, and wood-derived liquid smoke absorbed in said blend with the color and flavor of said liquid smoke being transferable from said blend second layer to a contiguous food product receiving surface within said bag in the presence of heated water; and a polyolefin third layer adhered to the outside surface of said core layer.

34. A thermoplastic casing formed of an extruded film consisting essentially of a blend of a thermoplastic polymer and poly (ethylene oxide) of at least about 70,000 weight average molecular weight with said poly (ethylene oxide) comprising between about 15 and about 40 wt. % of said blend, and a modifier absorbed in said blend said modifier being transferable from said film to a product surface within said casing.

35. A thermoplastic casing formed of extruded multilayer film comprising a core-barrier surface; a blend second layer adhered to the inside surface of the core layer and consisting essentially of a polyolefin first constituent and poly (ethylene oxide) second constituent of at least about 70,000 weight average molecular weight with said poly (ethylene oxide) comprising between about 15 and about 40 wt. % of said blend, having wood-derived liquid smoke absorbed in said blend with the color and flavor of said liquid smoke being transferable from said multilayer film to a contiguous food product receiving surface within said casing in the presence of heated water; and a polyolefin third layer adhered to the outside surface of said core layer.

36. A shirred thermoplastic casing formed of extruded multilayer film comprising a core-barrier layer; a blend second layer adhered to the inside surface of the core layer and comprising a polyolefin first constituent and poly (ethylene oxide) second constituent, said blend having wood-derived liquid smoke absorbed in said blend with the color and flavor of said liquid smoke being transferable from said second layer to a contiguous food product receiving surface within said casing in the presence of heated water; and a polyolefin third layer adhered to the outside surface of said core layer.

37. A thermoplastic bag formed of extruded multilayer film comprising a core-barrier layer; a second layer inside said core-barrier layer and comprising a blend of a polyolefin first constituent and a poly (ethylene oxide) second constituent, and wood-derived liquid smoke absorbed in said blend with the color and flavor of said liquid smoke being transferable from said layer to a contiguous food product receiving surface within said bag in the presence of heated water; and a polyolefin third layer adhered to the outside surface of said core layer, said multilayer film having been irradiated at dosage of at least about 2 MR.

38. A thermoplastic casing formed of extruded multilayer film comprising a core-barrier layer; a second layer adhered to the inside surface of the core layer and comprising a blend of a polyolefin first constituent and poly (ethylene oxide) second constituent, and wood-derived liquid smoke absorbed in said blend with the color and flavor of said liquid smoke being transferable from said second layer to a contiguous food product receiving surface within said casing in the presence of heated water; and a polyolefin third layer adhered to the outside surface of said core layer, said multilayer film having been irradiated at dosage of at least about 2 MR.

* * * * *

UNITED STATES PATENT AND TRADEMARK OFFICE
CERTIFICATE OF CORRECTION

PATENT NO. : 5,288,532

DATED : FEBRUARY 22, 1994

INVENTOR(S) : Roger L. Juhl

It is certified that error appears in the above-indentified patent and that said Letters Patent is hereby corrected as shown below:

Column 21, lines 39-40, change claim 6 to read as follows:
--An article according to claim 2 wherein said blend also includes polyethylene.--.

Signed and Sealed this

Seventh Day of March, 1995

Attest:

BRUCE LEHMAN

Attesting Officer

Commissioner of Patents and Trademarks